(12) United States Patent
Schmit

(10) Patent No.: US 9,769,182 B2
(45) Date of Patent: Sep. 19, 2017

(54) SYSTEM AND METHOD OF PREVENTING HIJACKING OF SECURITY SYSTEMS AND COMPONENTS

(71) Applicant: Honeywell International Inc., Morristown, NJ (US)

(72) Inventor: Thomas Paul Schmit, Leland, NC (US)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 96 days.

(21) Appl. No.: 14/616,196

(22) Filed: Feb. 6, 2015

(65) Prior Publication Data
US 2016/0234226 A1    Aug. 11, 2016

(51) Int. Cl.
| G06F 21/00 | (2013.01) |
| H04L 29/06 | (2006.01) |
| G06F 21/55 | (2013.01) |
| G08B 25/00 | (2006.01) |
| G08B 29/16 | (2006.01) |
| G08B 25/14 | (2006.01) |
| H04L 12/28 | (2006.01) |

(52) U.S. Cl.
CPC .......... *H04L 63/126* (2013.01); *G06F 21/554* (2013.01); *G08B 25/003* (2013.01); *G08B 29/16* (2013.01); *H04L 63/1425* (2013.01); *G08B 25/14* (2013.01); *H04L 12/2803* (2013.01)

(58) Field of Classification Search
CPC ...... G06F 21/55; G06F 21/552; G06F 21/554; H04L 63/14; H04L 63/1408; H04L 63/1416; H04L 63/1425
See application file for complete search history.

(56) References Cited

U.S. PATENT DOCUMENTS

| 8,456,278 B1 | 6/2013 | Bergman et al. |
| 2006/0291657 A1* | 12/2006 | Benson ............... G05B 13/0275 380/270 |
| 2007/0183597 A1 | 8/2007 | Bellwood et al. |
| 2009/0165114 A1 | 6/2009 | Baum et al. |
| 2011/0151796 A1* | 6/2011 | Walby ................. B60R 25/2072 455/67.7 |
| 2014/0344933 A1* | 11/2014 | Huh .................... H04L 63/0428 726/23 |

OTHER PUBLICATIONS

Extended European search report from corresponding EP patent application 16154130.5, dated May 25, 2016.

* cited by examiner

*Primary Examiner* — Edward Zee
(74) *Attorney, Agent, or Firm* — Husch Blackwell LLP

(57) ABSTRACT

A decentralized component is provided as an overly for a centralized system architecture as represented, for example, by a regional monitoring system. The decentralized component provides additional authentication of communications with a displaced monitoring service. Where agents of the decentralized component detect the presence of an unauthenticated monitoring service, messages can be generated or other actions can be taken to respond to that monitoring service.

16 Claims, 1 Drawing Sheet

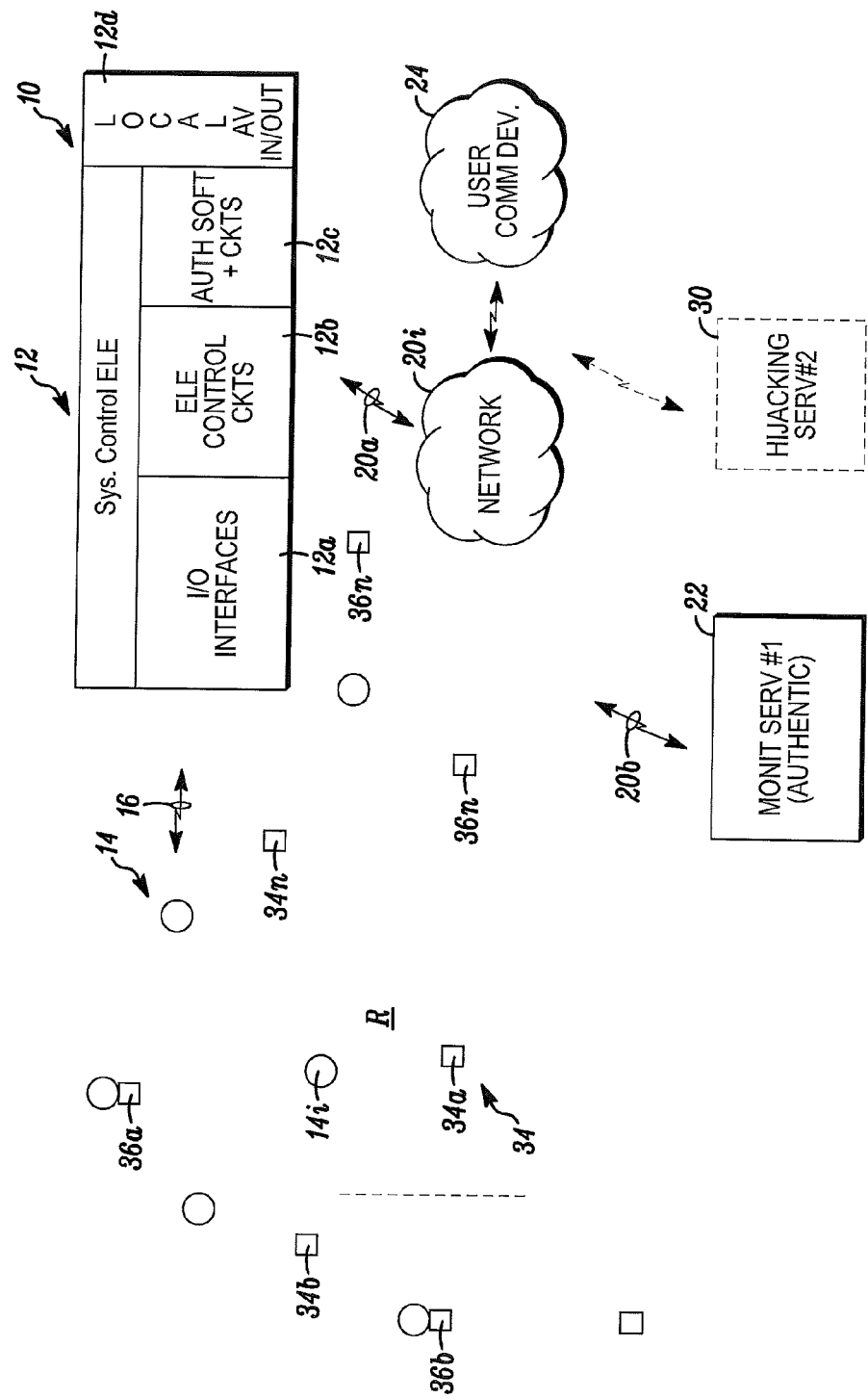

SYSTEM AND METHOD OF PREVENTING HIJACKING OF SECURITY SYSTEMS AND COMPONENTS

FIELD

The application pertains to systems and methods of preventing hijacking of security systems that have a centralized architecture. More particularly, the application pertains to such systems and methods that provide a decentralized component that includes watch dog agents to monitor and authenticate communications with a displaced monitoring service.

BACKGROUND

Security system monitoring services compete with each other for subscribers. As a result, it's not uncommon for these services to modify, replace, or add to the components of existing security system installations to acquire (i.e. hijack) subscribers from competitors. This is particularly disruptive since monitoring services often subsidize the costs of the security system components and initial installation.

Known monitored security systems often utilize a centralized architecture such that command and control of the system originates from the monitoring service. This architecture depends on the monitoring service maintaining a secure communications channel with the monitored installation. If this channel is hijacked by a competing service, then the competing service can also hijack the associated subscribers' accounts and associated income. This process is often referred to as a 'man-in-the-middle' cyber attack. Such practices often violate previous contracts between the monitoring service that paid for the initial installation and that installation's subscriber. Likewise, they are also assigned a high priority in the cyber threat models used in the design of the security systems.

BRIEF DESCRIPTION OF THE DRAWINGS

FIG. 1 illustrates a block diagram of a system in accordance herewith.

DETAILED DESCRIPTION

While disclosed embodiments can take many different forms, specific embodiments thereof are shown in the drawings and will be described herein in detail with the understanding that the present disclosure is to be considered as an exemplification of the principles thereof as well as the best mode of practicing the same and is not intended to limit the application or claims to the specific embodiment illustrated.

In one aspect, a decentralized component is provided to the mostly centralized system architecture referred to above for the purpose of preventing the unauthorized hijacking referred to above. More generally, the decentralized component provides added protection against man-in-the-middle cyber attacks.

In a disclosed embodiment, the decentralized component is implemented by designing 'watch dog' agents into the components of the security systems, especially those located at the edges of the network underlying the system architecture (e.g. sensors, device control points, user interface devices, etc.). In accordance herewith, the watch dog agents continuously provide additional authentication of communications with the monitoring service. Agents can also be implemented in a stand-alone form and be installed in the region of interest.

If a component's watch dog agent determines the communications are no longer authentic, then that component could, for example, initiate a notification of the parties involved and/or stop functioning or degrade its performance in such a way as to negate the incentive for hijacking. Local authentication software and/or circuitry can also be provided to evaluate messages received from the agents.

FIG. 1 illustrates aspects, as discussed above, of a system 10 in accordance herewith. Relevant types of systems 10, without limitation, include at least regional security and/or ambient condition monitoring systems or building automation systems.

An exemplary system 10 includes a system control element or panel 12. The element 12 can include a plurality of I/O interfaces 12a, local control circuits 12b, authentication software and/or circuitry 12c, and a local user interface 12d with audio/visual inputs and outputs to enable a local user to check system operation, enter comments or parameters, or carry out communications as needed.

As those of skill will understand, the element 12, via interfaces 12a, can be in communication with a plurality of detectors or input or output devices, generally indicated at 14. The devices of the plurality 14, such as 14i, can include ambient condition detectors, such as intrusion detectors, without limitation, condition sensing detectors, such as smoke or fire detectors, as well as alarm indicating input or output devices.

The members of the plurality 14 can communicate with the control element 12 via wired or wireless media, indicated generally at 16. Members of the plurality 14 would be installed as appropriate in a region R being monitored and controlled.

The control element 12 can be in communication, via one or more wired or wireless media, such as 20a, b and a computer network 20c, with a monitoring service facility 22 that is usually not co-located with the system 10. The facility 22 is the authentic facility intended to provide security, monitoring, or control functions relative to the region R via the system 10. The facility 22 can evaluate conditions in the region R based on signals and information collected via the local control element 12. Depending on the circumstances, the facility 22 can communicate information or messages as to the region R via the network 20c with a user's communication device, phone, or computer 24.

Conceptually, it will be understood that systems, such as the system 10, can be characterized as having a tree-like structure. Nodes are located at the tree root (referred to below as 'the root' or 'root node') and at each branch point representing the functions common to a security, fire detection, or premises automation system (referred to below as 'the system'). In this configuration, branches represent the flow of communications between the nodes.

The terminating or edge nodes (referred to below as 'edges' or 'edge') furthest from the root typically represent sensors, device control points, user interface devices, etc.

The nodes between the root and the edges are referred to as intermediate nodes or simply 'intermediates'. The structure of the tree between the root and edges varies based on system design requirements and constraints. The intermediates typically represent one or more control panels, power supplies, communications repeaters/hubs, etc.

The root node is normally not physically co-located at the installation sites of the intermediate and edge nodes. Likewise, logical groupings of intermediate and edge nodes may be installed at physically separate sites.

After system installation is completed, the root node of the tree represents the monitoring, command, and control point, such as the monitoring facility 22, having the highest authority within the system. The root is typically owned by the monitoring service.

The monitoring service is primarily responsible for ensuring the affected parties are notified of events communicated back to the root based on changes in state of the various nodes/functions comprising the tree. A secondary service of the root owner is maintaining and/or changing the configuration and functioning of the system.

During system installation, the root maybe temporarily owned by a seller and/or installer of the system. In this case, the command and control function of the root is used to tailor the configuration of the system to the installation site and to verify and test the system. After installation is completed, root ownership is transferred to the monitoring service although, in some cases, ownership of the command and control function may be retained by the installation service or transferred to a separate service for the purpose of maintaining the installed equipment (i.e. a site maintenance service).

In embodiments hereof, protection is provided to prevent a competitive unit, the hijacking server 30 illustrated in phantom in FIG. 1, from displacing the authentic facility 22 and communicating with the system 10. The hijacking service 30 can be at a location remote from any part of the system 10 or the authentic service facility 22, for example, anywhere there is a network cloud connection.

A plurality of agents, indicated generally at 34, can be installed in the region R. The agents can be implemented as stand alone devices, such as 34*a*, 34*b* . . . 34*n*. Alternately, the agents can be implemented as add-ons or modules coupled to members of the plurality 14, as illustrated as 36*a*, 36*b*, 36*c* . . . 36*r*.

It will be understood that the agents 36 could communicate with authentication software and/or circuits 12*c* (that could be implemented with one or more microprocessors that execute that software) in the element 12, with one another, or via the network 20*c* with the authentic monitoring service 22.

The agents 36 implement, at least in part, a secondary, de-centralized supervisory system that is superimposed over the more centralized monitoring system 10 as discussed above. Such agents can be regarded as residing in intermediate and/or edge nodes of the system 10. Intermediate nodes, as will be understood by those of skill, could include one or more control panels, power supplies, communications devices, repeaters, or the like, all without limitation. Edge nodes can include detectors, device control points, alarm indicting pull stations, or user interface devices, all without limitation.

In one aspect, agents may passively monitor events originating locally within a respective node. Alternately, respective agents can monitor system wide events. Agents are searching for patterns that indicate that the system root authority, for example, the monitoring service facility 22, has been compromised. In another aspect, agents can actively originate local events as well as system wide events that might indicate that the service facility 22 has been compromised by being displaced by the hijacking service facility 30.

If an agent ascertains that the root authority has been compromised (e.g. hijacked by a competing service provider), then the agent initiates counter-measure actions (referred to below as 'counter-measures') to be carried out by the device that hosts the node(s) and agent(s) referred to above. The details and severity of the counter-measures are determined by taking into account specifics of the system installation and its users.

If a residential account has been compromised/hijacked, then a more moderate and obscure response that directs user dissatisfaction toward the hijacker's service may be in order. This response may allow the system to continue working, but generate intermittent, spurious, and annoying diagnostic messages that require costly on site visits by the hijacker's service.

On the other hand, if the system is installed in a bank, then the response may include a blunt warning to the users that the system has ceased to operate because the cyber-security of the system has been compromised.

The example responses described above could be initiated and implemented autonomously by edge devices, such as user interfaces or sensors.

The above illustrates the decentralized and nuanced aspects hereof. Likewise, the above illustrates how the systems and methods disclosed augment the centralized aspects of dealing with system hijackers and cyber threats.

From the foregoing, it will be observed that numerous variations and modifications may be effected without departing from the spirit and scope hereof. It is to be understood that no limitation with respect to the specific apparatus illustrated herein is intended or should be inferred. It is, of course, intended to cover by the appended claims all such modifications as fall within the scope of the claims. Further, logic flows depicted in the figures do not require the particular order shown or sequential order to achieve desirable results. Other steps may be provided, steps may be eliminated from the described flows, and other components may be added to or removed from the described embodiments.

The invention claimed is:

1. A system comprising:
a common control element in communication with an authenticated monitoring service facility;
a plurality of detectors coupled to the common control element, wherein the plurality of detectors includes condition sensors, security sensors, or building automation related sensors; and
a decentralized monitoring unit, wherein the decentralized monitoring unit evaluates communications between the authenticated monitoring service facility and the common control element for one or more patterns that indicate that at least some of the communications are emanating from an unauthenticated source other than the authenticated monitoring service facility, and
wherein, when the decentralized monitoring unit determines that the at least some of the communications are emanating from the unauthorized source, the common control element intermittently generates diagnostic messages.

2. The system as in claim 1 wherein, when the decentralized monitoring unit senses the unauthenticated source, the decentralized monitoring unit generates notice messages or alters performance of at least one of the plurality of detectors.

3. The system as in claim 1 wherein, in response to determining that none of the patterns indicate that the at least some of the communications are emanating from the unauthenticated source, the decentralized monitoring unit updates a local log.

4. The system as in claim 3 wherein the decentralized monitoring unit transmits an authenticating indicium to the common control element in response to determining that none of the patterns indicate that the at least some of the communications are emanating from the unauthenticated source.

5. The system as in claim 1 wherein the decentralized monitoring unit comprises a plurality of decentralized monitoring units.

6. The system as in claim 4 wherein the decentralized monitoring unit comprises a plurality of decentralized monitoring units.

7. The system as in claim 1 wherein, in a presence of an authenticated source, the common control element continues to communicate local sensed conditions to the authenticated source.

8. The system as in claim 7 wherein, in a presence of the unauthenticated source, the decentralized monitoring unit provides indicia to the common control element indicative of the unauthenticated source.

9. A method comprising:
providing a regional monitoring system that detects conditions in a secured region, wherein a control panel of the regional monitoring system communicates with an authenticated monitoring service facility; and
providing a decentralized supervisory system that at least intermittently authenticates communications between the control panel and the authenticated monitoring service facility by evaluating the communications for patterns that indicate that at least some of the communications are emanating from an unauthenticated source other than the authenticated monitoring service facility,
wherein, when the decentralized supervisory system determines that the at least some of the communications are emanating from the unauthenticated source, the control panel intermittently generates diagnostic messages.

10. The method as in claim 9 further comprising generating an indicator in response to an authentication failure.

11. The method as in claim 10 further comprising communicating the indicator to the regional monitoring system.

12. The method as in claim 9 further comprising generating trouble indicators upon detection of an unauthenticated supervisory facility.

13. The method as in claim 12 further comprising generating the trouble indicators at a plurality of sites in the regional monitoring system and broadcasting the trouble indicators.

14. An apparatus comprising:
a security system, a condition monitoring system, or a building automation system in communication with an authenticated monitoring service facility; and
a supervisory system comprising a plurality of agents,
wherein the plurality of agents detect communications associated with the security system, the condition monitoring system, or the building automation system,
wherein the plurality of agents evaluate the communications between the authenticated monitoring service facility and the security system, the condition monitoring system, or the building automation system for one or more patterns that indicate that at least some of the communications are emanating from an unauthorized source other than the authenticated monitoring service facility, and
wherein, when the plurality of agents determine that the at least some of the communications are emanating from the unauthorized source, a control panel of the security system, the condition monitoring system, or the building automation system intermittently generates diagnostic messages.

15. The apparatus as in claim 14 further comprising circuitry for communicating with a wireless user device, wherein, responsive to determining that the one or more patterns indicate that the at least some of the communications are emanating from the unauthorized source, the supervisory system transmits a warning indication to the wireless user device.

16. The apparatus as in claim 14 further comprising circuitry for communicating with a wireless user device, wherein, responsive to determining that the one or more patterns indicate that the at least some of the communications are emanating from the unauthorized source, the supervisory system transmits a performance altering indicium to the security system, the condition monitoring system, or the building automation system.

* * * * *